(12) United States Patent
Venkataramanan et al.

(10) Patent No.: US 9,176,738 B2
(45) Date of Patent: Nov. 3, 2015

(54) METHOD AND APPARATUS FOR FAST DECODING AND ENHANCING EXECUTION SPEED OF AN INSTRUCTION

(75) Inventors: Ganesh Venkataramanan, Sunnyvale, CA (US); Emil Talpes, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1208 days.

(21) Appl. No.: 13/005,215

(22) Filed: Jan. 12, 2011

(65) Prior Publication Data

US 2012/0179895 A1 Jul. 12, 2012

(51) Int. Cl.
*G06F 9/30* (2006.01)
*G06F 9/38* (2006.01)

(52) U.S. Cl.
CPC .......... *G06F 9/3017* (2013.01); *G06F 9/30145* (2013.01); *G06F 9/3836* (2013.01); *G06F 9/3889* (2013.01)

(58) Field of Classification Search
CPC .................................................... G06F 9/3836
USPC ....................................................... 712/214
See application file for complete search history.

(56) References Cited

U.S. PATENT DOCUMENTS

| | | | | |
|---|---|---|---|---|
| 6,195,744 | B1* | 2/2001 | Favor et al. ................... | 712/215 |
| 6,728,869 | B1* | 4/2004 | Mang et al. ................... | 712/218 |
| 2004/0230773 | A1* | 11/2004 | Busaba et al. ................ | 712/215 |
| 2008/0209184 | A1* | 8/2008 | Ahmed et al. ................ | 712/222 |
| 2009/0259830 | A1* | 10/2009 | Indukuru et al. ............. | 712/227 |
| 2012/0124586 | A1* | 5/2012 | Hopper et al. ................ | 718/102 |
| 2012/0144173 | A1* | 6/2012 | Butler et al. ................. | 712/245 |
| 2012/0144174 | A1* | 6/2012 | Talpes et al. ................. | 712/246 |
| 2012/0144175 | A1* | 6/2012 | Venkataramanan et al. .. | 712/246 |

\* cited by examiner

*Primary Examiner* — Andrew Caldwell
*Assistant Examiner* — Keith Nielsen
(74) *Attorney, Agent, or Firm* — Volpe and Koenig, P.C.

(57) ABSTRACT

Method and apparatus for fast decoding of microinstructions are disclosed. An integrated circuit is disclosed wherein microinstructions are queued for execution in an execution unit having multiple pipelines where each pipeline is configured to execute a set of supported microinstructions. The execution unit receives microinstruction data including an operation code (opcode) or a complex opcode. The execution unit executes the microinstruction multiple times wherein the microinstruction is executed at least once to get an address value and at least once to get a result of an operation. The execution unit processes complex opcodes by utilizing both a load/store support and a simple opcode support by splitting the complex opcode into load/store and simple opcode components and creating an internal source/destination between the two components.

20 Claims, 4 Drawing Sheets

METHOD AND APPARATUS FOR FAST DECODING AND ENHANCING EXECUTION SPEED OF AN INSTRUCTION

FIELD OF INVENTION

This application is related to processors and methods of processing.

BACKGROUND

Conventionally processors are designed to process operations that are typically identified by operation codes (opcodes). In the design of new processors, it is important to be able to process all of a standard set of operations so that existing computer programs based on the standardized codes will operate without the need for translating operations into an entirely new code base. Processor designs may further incorporate the ability to process new operations, but backwards compatibility to older instruction sets is often desirable.

Dedicated pipeline queues have been used in multi-pipeline execution units of microprocessors in order to achieve faster processing speeds. In particular, dedicated queues have been used for execution units having multiple pipelines that are configured to execute different subsets of a set of supported microinstructions. Dedicated queuing has generated various bottlenecks and problems for the scheduling of microinstructions that require both numeric manipulation and retrieval/storage of data.

Additionally, microprocessors are conventionally designed to process microinstructions that are typically identified by opcodes. In the design of new microprocessors, it is important to process all of a standard set of microinstructions so that existing computer programs based on standardized codes will operate without the need for translating microinstructions into an entirely new code base. Microprocessor designs may further incorporate the ability to process new microinstructions, but backwards compatibility to older instruction sets is often desirable.

Execution of microinstructions/operations is typically performed in an execution unit of a processor core. To increase speed, multi-core processors have been developed. Also to facilitate faster execution throughput, "pipeline" execution of operations within an execution unit of a processor core is used. Cores having multiple execution units for multi-thread processing are also being developed. However, there is a continuing demand for faster throughput for processors.

One type of standardized set of operations is the instruction set compatible with prior "x86" architectures that have enjoyed widespread use in many personal computers. The microinstruction sets, such as the "x86" instruction set, include operations requiring numeric manipulation, operations requiring retrieval and/or storage of data, and operations that require both numeric manipulation and retrieval/storage of data. To execute such operations, execution units within processor cores have included two types of pipelines: arithmetic logic pipelines ("EX pipelines") to execute numeric manipulations and address generation pipelines ("AG pipelines") to facilitate load and store operations.

In order to quickly and efficiently process operations as required by a particular computer program, the program commands are decoded into operations within the supported set of microinstructions and dispatched to the execution unit for processing. Conventionally, an opcode is dispatched that specifies what operation/microinstruction is to be performed along with associated information that may include items such as an address of data to be used for the operation and operand designations.

Dispatched instructions/operations are conventionally queued for a multi-pipeline scheduler of an execution unit. Queuing is conventionally performed with some type of decoding of a microinstruction's opcode in order for the scheduler to appropriately direct the instructions for execution by the pipelines with which it is associated within the execution unit.

In the x86 format instruction, an instruction may have an opcode including one or two opcode bytes, a modify register or memory ("mod r/m") byte, a scale-index-base ("sib") byte, displacement bytes, and immediate data bytes. These opcodes are also known as simple opcodes. The opcode specifies the operation code, and may also contain a register identifier. The mod r/m byte specifies whether an operand is in a register or in memory. If the operand is in memory, fields in the mod r/m byte specify the addressing mode to be used. Certain encodings of the mod r/m byte indicate that a second byte, the sib byte, follows to fully specify the addressing mode. The sib byte includes a 2-bit scale field, a 3-bit index field, and a 3-bit base field. These fields are used in complex memory addressing modes to specify how address computation is done. The displacement byte is used in address computation. The immediate data byte is used for an instruction operand. One or more additional bytes, known as prefix bytes, may appear before the opcode byte. The prefix byte changes the interpretation of the instruction, adding additional complexity. The length of an instruction in the x86 instruction formats is variable. The minimum instruction includes a single opcode byte and is 8 bits long. A long instruction that includes a prefix byte may be 104 bits long. Longer instructions containing more than a single prefix byte may also be possible.

Some of the opcodes passed from Decode (DE) to arithmetic logic (EX) operation stage are Complex Operations (complex opcodes) that comprise a load operation with a simple opcode; a store operation with a simple opcode; or a load-store operation. Processing such complex opcodes in an arithmetic logic pipeline (EX pipeline) design is problematic because one part of the complex opcodes must be completed before the other part is processed. Also the internal complex opcode dependency needs to be properly addressed for aligning internal sources and destination register numbers.

One skilled in the art would recognize that due to the problems associated with processing complex opcodes, there is an increase in chip area and power requirements for a scheduler block in the processor while simultaneously decreasing the processing efficiency of the execution unit since most instructions are uni-cyclical.

SUMMARY OF EMBODIMENTS

In one aspect of the invention, an integrated circuit (IC) is provided that includes an execution unit having multiple pipelines where each pipeline is configured to execute multiple times for any given complex operating code (complex opcode). The IC preferably includes a scheduler unit configured with a 40 opcode queue where each queue position supports up to four sources with a destination corresponding to information passed from a decode unit with each opcode.

Another aspect of the invention is methods for scheduling microinstructions in a processor execution unit. In one such method, data is received by the execution unit with respect to a microinstruction including complex opcodes, and the execution unit processes complex opcodes by utilizing both a load/store support and the simple opcode support by splitting the complex opcode into load/store and simple opcode components and creating an internal source/destination between the two.

DETAILED DESCRIPTION

Figure 1:
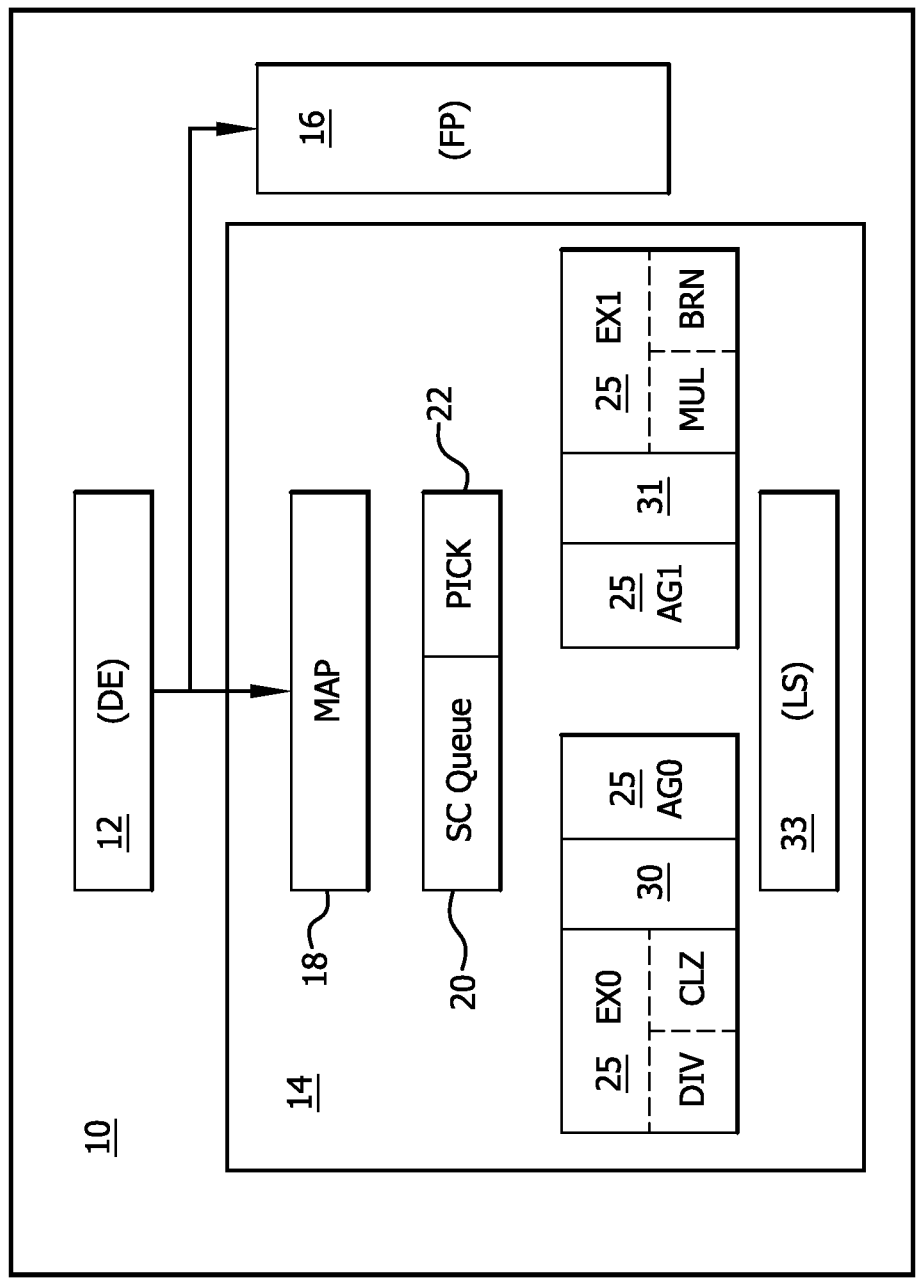
FIG. 1 is a block diagram of a processor core configured in accordance with an embodiment of the present invention.

Referring to FIG. 1, an example of an embodiment of the invention is illustrated in the context of a processor core 10 of a multi-core Integrated Circuit (IC). Instructions in the form of operation codes (opcodes) are processed in the multi-core IC. The processor core 10 has a decoder unit 12 that decodes and dispatches microinstructions to a fixed point execution unit 14. Multiple fixed point execution units may be provided for multi-thread operation. In a preferred embodiment, a second fixed point execution unit (not shown) is provided for dual thread processing.

A floating point unit 16 is provided for execution of floating point instructions. Preferably, the decoder unit 12 dispatches instructions in information packets over a common bus to both the fixed point execution unit 14 and the floating point unit 16.

The execution unit 14 includes a mapper 18 associated with a scheduler queue 20 and a picker 22. These components control the selective distribution of operations among a plurality of arithmetic logic (EX) and address generation (AG) pipelines 25 for pipeline execution. The pipelines 25 execute operations queued in the scheduling queue 20 by the mapper 18 that are picked therefrom by the picker 22 and directed to an appropriate pipeline. In executing a microinstruction, the pipelines identify the specific kind of operation to be performed by a respective operation code (opcode) assigned to that kind of microinstruction.

In an example embodiment, the execution unit 14 includes pipelines for executing queued operations. Arithmetic logic pipelines EX and address generation AG pipelines are associated with sets of physical registers (PRNs) in which data is stored relating to execution of specific operations by those two pipelines.

The processing speed of the execution unit 14 may be affected by the operation of any of the components. Since all the microinstructions that are processed must be mapped by the mapper 18 into the scheduling queue 20, any delay in the mapping/queuing process may adversely affect the overall speed of the execution unit.

In the example illustrated in FIG. 1, the mapper 18 is configured to queue a microinstruction into an open queue position based on the microinstruction's information packet received from the decoder 12. The mapper 18 of execution unit 14 is configured to receive two instruction information packets in parallel which the mapper may queue in a single clock cycle.

The mapper is configured to scan queue positions QP1 ... QPn to identify an open queue position. Each queue position QP1 ... QPn is associated with memory fields for an Address Generation instruction (AG Payload), an Arithmetic/Logic instruction (ALU Payload), four Wake Up Content Addressable Memories (CAMs) SrcA, SrcB, SrcC, SrcD that identify addresses of PRNs that contain source data for the instruction and a destination Random Access Memory (RAM) (Dest) that identifies a PRN where the data resulting from the execution of the microinstruction is to be stored.

A separate data field (Immediate/Displacement) is provided for accompanying data that an instruction is to use. Such data is sent by the decoder in the dispatched packet for that instruction.

The AG and EX fields are configured to contain the specific identity of an instruction as indicated by the instruction's opcode along with relative address indications of the instruction's required sources and destinations that are derived from the corresponding dispatched data packet. In connection with queuing, the mapper translates relative source and destination addresses received in the instruction's information packet into addresses of PRNs associated with the pipelines 25.

The mapper tracks relative source and destination address data received in the instruction information packets so that it may assign the same PRN address to a respective source or destination where two instructions reference the same relative address.

In the scheduler queue 20, flags are provided to indicate eligibility for picking the instruction for execution in the respective pipelines as indicated in the columns respectively labeled EX0, EX1, AG0, and AG1. The execution unit picker 22 preferably includes an individual picker for each of the four pipelines EX0, EX1, AG0, AG1. Each respective pipeline's picker scans the respective pipeline picker flags of the queue positions to find queued operations that are eligible for picking. Upon finding an eligible queued operation, the picker checks to see if the instruction is ready to be picked. If it is not ready, the picker resumes its scan for an eligible instruction that is ready to be picked. Preferably, the EX0 and AG0 pickers scan the flags from the top queue position QP1 to the bottom queue position QPn and the EX1 and AG1 pickers scan the flags from the bottom queue position QPn to the top queue position QP1 during each cycle. A picker will stop its scan when it finds an eligible instruction that is ready and then direct that instruction to its respective pipeline for execution. Preferably this occurs in a single clock cycle.

Readiness for picking is indicated by the source wake up CAMs for the particular operation component being awake indicating a ready state. Where there is no wake up CAM being utilized for a particular instruction component, the instruction is automatically ready for picking. For example, the LD operation queued in queue position QP1 does not utilize any source CAMs so that it is automatically ready for picking by either of the AG0 or AG1 pickers upon queuing. In contrast, the ADD instruction queued in queue position QP2 uses the queue position's wake up CAMs ScrA and ScrB. Accordingly, that ADD instruction is not ready to be picked until the PRNs have been indicated as ready by queue position QP2's wake up CAMs ScrA and ScrB being awake.

Where one of the arithmetic pipelines is performing a multi-cycle operation, the pipeline preferably provides its associated picker with an instruction to suspend picking operations until the arithmetic pipeline completes execution of that multi-cycle operation. In contrast, the address generation pipelines are preferably configured to commence execution of a new address generation instruction without awaiting the retrieval of load data for a prior instruction. Accordingly, the pickers will generally attempt to pick an address generation instruction for each of the address generation pipelines AG0, AG1 for each clock cycle when there are available address generation instructions that are indicated as ready to pick.

In some cases, the CAMs may awake before the required data is actually stored in the designated PRN. Typically, when a load instruction is executed where a particular PRN is indicated as the load destination, that PRN address is broadcast after four cycles to the wake up CAMs for awakening all other CAMs designated with the PRN's address. Four cycles is a preferred nominal time it takes to complete a load operation. However, it may take much longer if the data is to be retrieved by the LS unit 33 from a remote location. Where an instruction is picked before the PRN actually contains the required data, the execution unit is preferably configured to replay the affected instructions which are retained in their queue positions until successful completion.

There are three kinds of operations requiring retrieval and/or storage of data, namely, load (LD), store (ST) and load/store (LD-ST). These operations are performed by the address generation pipelines in connection with a Load-Store (LS) unit 33 of the execution unit 14 in the example illustrated in FIG. 1.

Both load and load/store operations generally are multi-cycle operations that typically require a minimum of four (4) cycles to be completed by the address generation pipelines. Load and load/store operations identify an address of data that is to be loaded into one of the PRNs of PRN sets 30, 31 associated with the pipelines 25. For load/store operations, the data that is retrieved from an identified address is processed and subsequently stored in the address from where it was retrieved.

Store operations typically require a single cycle to be completed. This is because a store operation will identify where data from one of the PRNs of the PRN sets 30, 31 is to be stored. Once that address is communicated to the load/store unit 33, it performs the actual storage so that the activity of an address generation pipeline is complete after a single clock cycle.

Hence these operations may be termed as complex instructions or complex opcodes. As discussed above, processing complex opcodes in the EX pipeline is problematic because one part of the complex opcodes must be completed before the other part is processed.

Generally, there are three possible combinations of opcodes/instructions at any given level for execution. These combinations include instructions that execute an operation between two registers, instructions that may write destination addresses in one of the registers after execution of an operation between two registers and instructions that may perform additional operations between a register and a memory location. When processing these and other combinations at a processor that does not process complex opcodes, the processor has to split the combinations in multiple parts for processing because of dependence of parts on each other, i.e. one part may have to wait for the other parts to be processed first. A processor that supports complex opcodes may be able to process these and other combinations easily.

Figure 2:
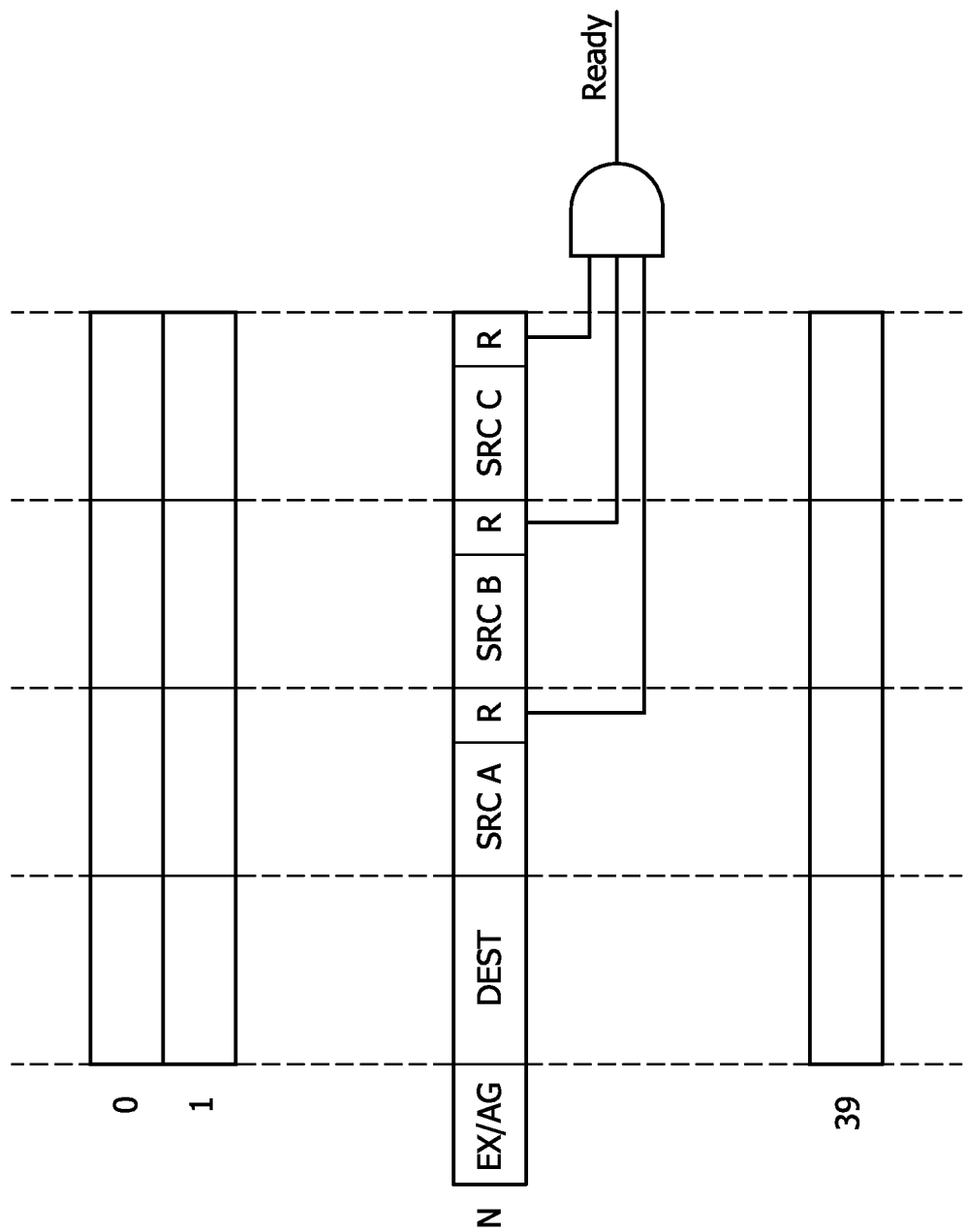
FIG. 2 depicts the fields of a scheduler array for a processor which does not support complex opcodes and related scheduling of the instructions.

FIG. 2 provides a scheduler diagram for a processor that does not support complex opcodes. In FIG. 2, the EX/AG field specifies whether the opcode goes to the EX or the AG. Only one of them may be active, since the opcode is executed only once. Dest is the destination of the opcode. SrcA, SrcB, and SrcC are the opcode sources, and up to three (3) PRNs may be supported. Each of opcode sources may be premarked as ready, or may become ready when data becomes available.

An AG pipeline opcode may have up to two (2) sources (Base and Index) while an EX pipeline opcode may have up to three (3) sources (RegA, RegB and Flag). The opcode may be picked for execution when all its sources are marked as ready.

In FIG. 2, because each instruction is split into multiple parts, there is a corresponding increase in logic required for performing each instruction. Further there is a dependency for each microinstruction because a new microinstruction cannot be queued as another instruction might be pending in the EX unit. In the execution process of FIG. 2, there is a dependency because address generation must be performed first before execution and therefore there is a limit to the number of additional instructions that may be in the queue for the EX pipeline. Because each instruction needs to wait for a certain time before execution to satisfy the dependency, there is an increased requirement for memory, power and other system resources.

Figure 3:
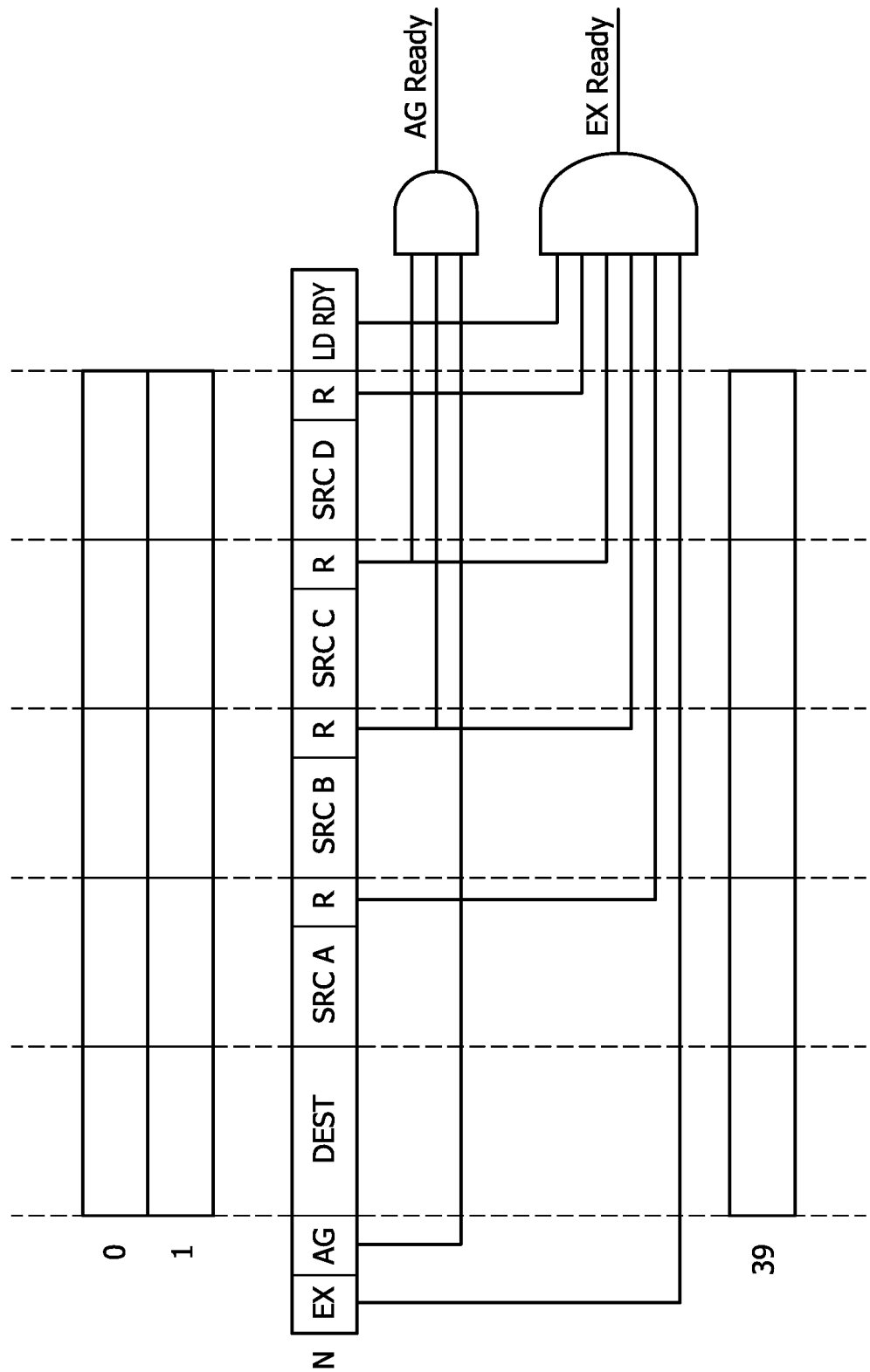
FIG. 3 depicts the fields of a scheduler array for a processor which supports complex opcodes and related scheduling of the instructions.

A description of the use of the scheduler for a processor that supports complex opcodes is now provided with respect to FIG. 3. Use of complex opcodes for proper queuing as described in the embodiments herein reduces the overall number of instructions in the execution pipeline. A single instruction is used throughout the machine where one instruction is transformed from several sources and is executed multiple times. The instruction is executed once to get an address value and an address and then executed again to get the result of an operation. A processor supporting complex opcodes handles the entire instruction as a single unit, occupying a single scheduler slot as shown in FIG. 3.

In FIG. 3, both EX and AG pipelines have separate bits, since a single complex operation may be executed in both AG and EX pipes. There is an additional source, SrcD in the scheduler array. This is required because a complex opcode may have up to four (4) sources (two (2) for the AG flow and two (2) for the EX flow). The EX flow may have up to 3 sources. In cases where the complex opcode does not have an AG component, one of the AG sources may be used for the EX flow. In cases where the complex opcode has an AG component, the third source of the EX flow may only be the destination of the AG component. In these cases the processor may allocate a temporary PRN to hold the load data. This PRN is not maintained in the scheduler array; therefore it is not shown in FIG. 3.

The Ld_Rdy field specifies whether the EX flow needs to wait until a memory operand (the temp PRN) becomes available. The scheduler entry may be picked for execution in either of the AG or EX pipes. The AG pipes may be picked if the AG bit is set and SrcB and SrcC are ready to be consumed. The EX pipes may be picked if the EX bit is set and all the sources are ready. The Ld_Rdy bit needs to be set as well, to mark that either a load is not required or the result has already been received. In the case where the complex opcode has an AG component, the EX does not use SrcB and SrcC.

In FIG. 3, each queue position 0 . . . n is associated with memory fields for an Address Generation instruction, an Arithmetic/Logic instruction, four Wake Up Content Addressable Memories (CAMs) SrcA, SrcB, SrcC, SrcD that identify addresses of PRNs that contain source data for the instruction and a destination Random Access Memory (RAM) (best) that identifies a PRN where the data resulting from the execution of the microinstruction is to be stored. A separate data field (R) is provided for accompanying data that an instruction is to use. Such data is sent by the decoder in the dispatched packet for that instruction. The R bit indicates source is ready or not.

The AG and EX fields are configured to contain the specific identity of an instruction as indicated by the instruction's opcode along with relative address indications of the instruction's required sources and destinations that are derived from the corresponding dispatched data packet. In connection with queuing, the mapper translates relative source and destination addresses received in the instruction's information packet into addresses of PRNs associated with the pipelines.

To address the problems associated with processing of complex operations, an arithmetic logic (EX) scheduler is provided. The EX Scheduler is designed with a 40 opcode queue where each queue position supports up to four sources along with a destination corresponding with information passed from DE with each opcode.

Each queue position is generically designed with both load and store support (AG fields) and simple opcode support (EX fields) tied to the four sources and destination designations for that queue position. To process complex opcodes, the queue positions are configured to utilize both the load/store support and the simple opcode support by splitting the complex opcode into load/store and simple opcode components and creating an internal source and destination between the two.

In the case of a complex opcode including a load, an internal destination designation is provided, which then serves as an appropriate internal source for the complex opcodes' simple opcode component. Whether a load is an opcode or part of a complex opcode from decode DE, it may be associated with either one of the four sources available for the queue position or an immediate passed from DE. For a load-type complex opcode, the complex opcodes' simple opcode component is then able to utilize any of the other three of the four queue position sources along with the internal source according to requirement. There may be up to 40 entries in the scheduler and all may be similar—and each entry may support up to four entries passed from decode stage together with complex opcode. There may be four sources, one destination and each queue position may be an internal destination/source for the complex opcode.

In the case of a complex opcode including a Store, an internal destination designation is provided for the result of processing the complex opcodes' simple opcode which then serves as an appropriate internal source for the store. Accordingly, whether a store is an opcode or part of a complex opcode from DE, it may be associated with the destination available for the queue position. For a store-type complex opcode, the complex opcodes' simple opcode component may be able to utilize all four queue position sources as any other simple opcode is not part of a complex opcode.

This operation of creating internal sources and destinations to the complex opcode is done by a fast decode and detect logic before writing into the payload. This helps the machine by removing critical logic on the output of the payload thus making it run faster despite the complexity of splitting a complex opcode into two units of operation. The Scheduler is configured to pick a queue position holding a complex opcode twice, once for each part of the complex opcode operations. Hence by adding some additional resources to an existing structure, more instructions may be pipelined.

To implement complex opcodes in the processor core of FIG. 1, the scheduler queue 20 is configured as a unified queue for queuing instructions for all execution pipelines 25 within the execution unit 14. Referring to FIG. 3, the queue illustrates a plurality of queue positions 0 . . . 39. The scheduler may have up to 40 positions. The scheduler adds, stores and applies the result from different sources (B and C), Source D, flags, marks both EX and AG pipelines and depending on the load, sends the instruction for final execution.

The processor core of FIG. 1 is designed to process complex opcodes, and therefore instead of using (n, n+1) memory locations, the complex opcode scheduler uses only a single memory location n but executes the instruction multiple times. This type of scheduling in a unified scheduling queue enables highly efficient execution of the queued operations that is realized in increased overall throughput processing speed of the execution unit. It provides a method for making highly efficient use of the pipeline processing resources by efficient queuing and picking of both arithmetic and address generation components of both single and dual component microinstructions.

To differentiate between schedulers of processors that support complex opcodes and simple opcodes, various examples are provided. It would be clear to those skilled in the art that other examples are also possible.

In one example, an addition is performed between a register (RAX) and a memory location (ADD RAX, [RBX+RSI*2]). The address of the memory location is specified by a value of another register and a memory address [RBX, RSI*2]. The instruction is: ADD RAX, [RBX+RSI*2]. This instruction adds the content of register RAX with the value from the memory address RBX+RSI*2 and stores the result in RAX. This instruction is a load-op instruction because it needs to perform the load first, followed by the execution.

When executed by a processor that does not support complex opcodes, the processor may split the example instruction as described into two (2) components, each of them occupying a scheduler slot (as shown in FIG. 2). These include slots for MOV TMP, [RBX, RSI]; and slots for ADD RAX, TMP. The scheduler may be set up for the instruction as follows: The first slot is marked as a destination for the temp PRN, SrcA a destination for RBX, SrcB a destination for RSI, and SrcC may be unused and marked as ready at allocation. The EX/AG fields will be 0 (AG). The second slot is marked as a destination for RAX, SrcA a destination for RAX, SrcB a destination for the temp PRN, SrcC may be unused and marked as ready at allocation. The EX/AG field will be 1 (EX).

A processor that supports complex opcodes may process this example (ADD RAX, [RBX+RSI*2]) as a single unit, occupying a single scheduler slot as shown in FIG. 3. The instruction may be reduced to ADD RAX, [RBX, RSI] and the scheduler fields (of FIG. 3) may be allocated as follows: The destination for the PRN is associated to RAX, SrcA for RAX, and SrcB for RBX, and SrcC for RSI. SrcD is unused and marked as ready. The EX and AG fields will be both set, and the LD_RDY field is initialized as 0 (load not ready).

In another example, the instruction for processing is ADC RAX, RBX. This instruction adds the content of register RAX with the content of RBX and with the content of the carry (C) flag. The result is written into RAX. This instruction translates to a simple opcode, since it does not access memory.

When this instruction (ADC RAX, RBX) is executed by a processor that does not support complex opcodes, the processor may execute this instruction as a simple opcode. Additionally, a processor that supports complex opcodes may also execute the example instruction as a simple opcode. Therefore, both types of processors may handle this instruction as a single opcode, occupying one scheduler slot.

For a machine that does not support complex opcodes, when executing the instruction ADC RAX, RBX, the scheduler fields (of FIG. 2) may be set as: a destination for the PRN associated to RAX, SrcA as a destination for RAX, SrcB as a destination for RBX, and SrcC as a destination for the C flag. The EX/AG fields may be set to 1 (EX).

For a machine that supports complex when executing the instruction ADC RAX, RBX, the scheduler fields (of FIG. 3), the scheduler fields may be set as: a destination for RAX, SrcA as a destination for RAX, SrcB as a destination for RBX, SrcC as a destination for the C flag, and SrcD may be unused, but marked as ready. The EX pipeline may be set, and AG cleared. The Ld_Rdy field in FIG. 3 may be set, signaling that the opcode does not wait for a load component.

In another example, the instruction for processing is ADD [RBX+RSI*2], RAX. This instruction adds contents of the register RAX and the memory content from address RBX+RSI*2, and it stores the result to the same memory address from which the memory content was retrieved. This example is opposite to the example described earlier (ADD RAX, [RBX+RSI*2]) and the instruction does the load, followed by an addition and then the store, i.e. a load-add-store opcode.

When executed by a processor that does not support complex opcodes, the processor may execute this instruction by splitting it into three opcodes. The three opcodes may be a MOV TMP, [RBX, RSI]; ADD TMP, RAX; and MOV [RBX, RSI], TMP.

The scheduler fields in FIG. 2 (while executing at a processor that does not support complex opcodes) are allocated as follows. The first slot may be a destination for the temp PRN, SrcA a destination for RBX, SrcB a destination for RSI, and SrcC will be unused and marked as ready at allocation. The EX/AG will be 0 with (AG). The second slot may be a destination for RAX, SrcA a destination for RAX, SrcB a destination for the temporary PRN, and SrcC will be unused and marked as ready at allocation. The EX/AG may be 1 with (EX). The third slot maybe an unused destination, SrcA a destination for the RBX PRN, SrcB a destination for the RSI PRN, and SrcC a destination for the temp PRN. The EX/AG may be marked as 0 with (AG).

A processor supporting complex opcodes handles the entire instruction as a single unit, occupying a single scheduler slot as shown in FIG. 3. The processor supporting the complex opcodes may handle the instruction as ADD [RBX, RSI], RAX and the scheduler fields, in FIG. 3, may be allocated as: the first slot is marked as destination unused, SrcA a destination for RAX, SrcB a destination for RBX, and SrcC a destination for RSI. SrcD is unused and marked as ready. The EX and AG fields may be both set, and the Ld_Rdy may be initialized as 0 (load not ready).

When implementing the example instructions as described above in a typical microprocessor such as one shown in FIG. 1, values are moved at the end of an operation to a temporary register, and a second instruction is used (add RAX to temporary register).

Figure 4:
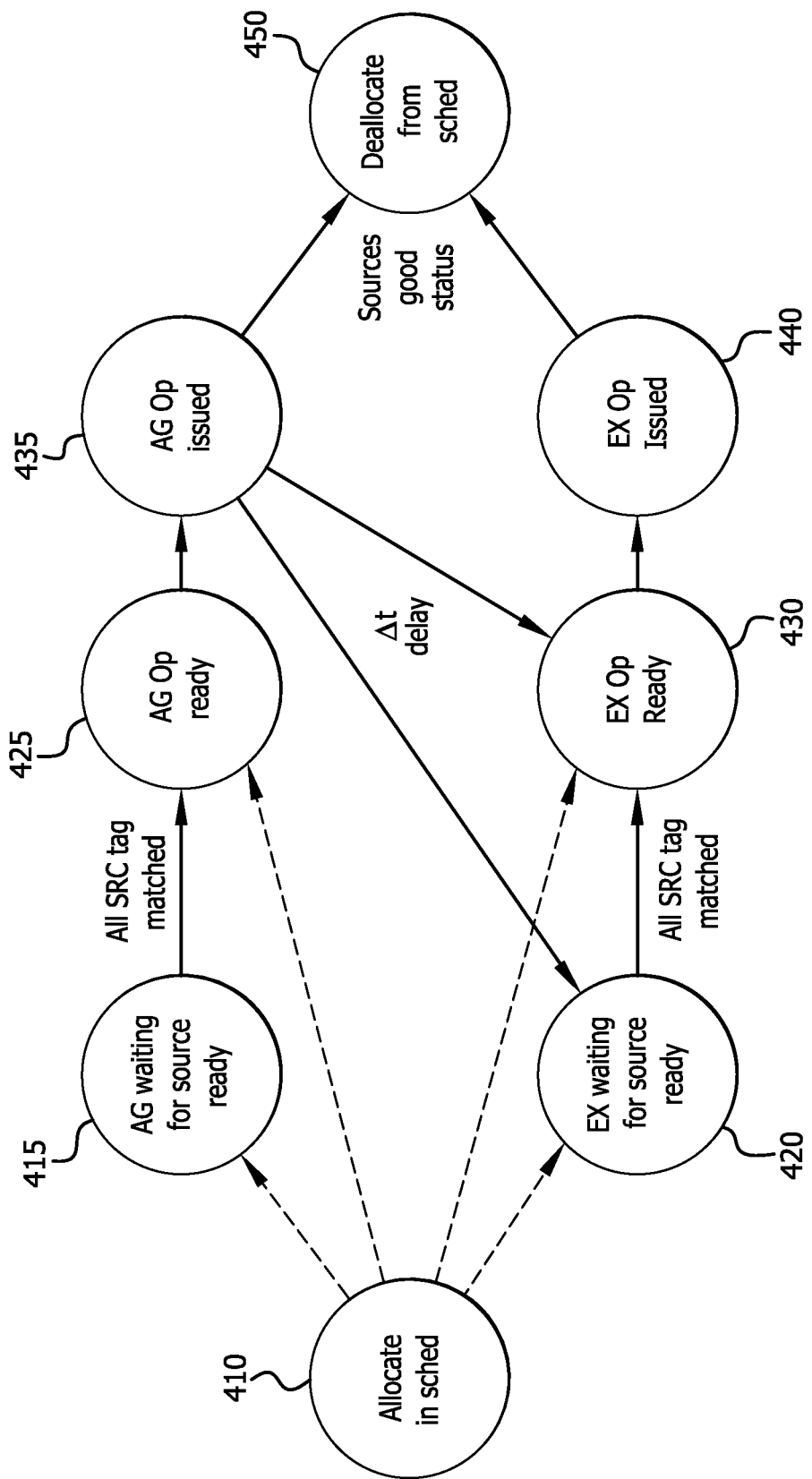
FIG. 4 shows a state transition diagram for the scheduling of complex opcodes.

FIG. 4 shows a state transition diagram for the scheduling of complex opcodes. In FIG. 4, after the status of EX opcode is determined to be "good", the pipe-control determines if the complex opcode may be de-allocated from the scheduler queue. A maximum of four queue entries may get de-allocated every cycle, and pipe control logic is responsible for determining entries for de-allocation. For micro-operations (uops) that have Load data as their source operands, the status of the uop is known "good" or "bad" only a cycle after the actual execution of the uop. If the status is bad, the uops that get speculatively woken up may or may not get issued depending on the picker bandwidth. Ultimately the Load that failed returns good data and all the dependent uops get either woken up and start re-requesting a pick if they already got issued or retain their requests to get picked. To simplify the pipeline, the status of any opcode (whether it is dependent on load data or not) is checked one cycle after its execution.

In FIG. 4, state transitions possible for each complex opcode in the scheduler are described. In an initial stage, an opcode is allocated to the scheduler 410. At this point, both the AG and EX components may be ready 415, 420 (if all their sources are available) or they may wait for their sources to become ready. It should be apparent that if the complex opcode does not have an EX or AG component, the states associated with that component will not be utilized.

If either of the components is waiting for sources to become ready, the scheduler compares SrcA/SrcB/SrcC/SrcD against all the destinations of executed ops and marks them ready as they are produced. When all the necessary sources become ready, the component is moved to the Ready state 425, 430 (AG Op Ready or EX Op Ready).

From the Ready state, the component may be picked for execution. The AG component will be executed by one of the AG pipes 435, while the EX component will be executed by one of the EX pipes 440. In case of a complex opcode with both load and execution components, the EX component may only be picked when the load data is available. This happens only after the load address is computed (by the execution of the AG component) and the data is returned from the memory subsystem (the Δt delay in FIG. 4).

The EX component may be source-ready (in the EX Op Ready state) even when the load data is not available. However, it may not proceed further to execution unless the load data is received.

After both the AG and the EX components are picked and executed, the scheduler entry may be unallocated 450. A new complex opcode may be allocated after this point 450, which then starts monitoring its sources for execution.

Embodiments of the present invention may be represented as instructions and data stored in a computer-readable storage medium. For example, aspects of the present invention may be implemented using Verilog, a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

The embodiments described herein may be implemented to either a CPU or a GPU, a digital signal processor (DSP) or a field programmable gate array (FPGA) or any combination thereof. Those skilled in the art would appreciate that the processor may form part of another device—e.g., an integrated north bridge, an application processor (Apps Processor), a central processing unit (CPU), a digital signal processor (DSP) or the like. Suitable processors include, by way of example, a general purpose processor, a special purpose processor, a conventional processor, a DSP, a plurality of microprocessors, one or more microprocessors in association with a DSP core, a controller, a microcontroller, Application Specific Integrated Circuits (ASICs), FPGAs circuits, any other type of integrated circuit (IC), and/or a state machine.

Additionally, the present invention may be embodied in hardware, software, firmware, or any combination thereof. Embodiments of the present invention or portions thereof may be encoded in many programming languages such as hardware description languages (HDL), assembly language, C language, and netlists etc. For example, an HDL, e.g., Verilog, may be used to synthesize, simulate, and manufacture a device, e.g., a processor, application specific integrated circuit (ASIC), and/or other hardware element, that implements the aspects of one or more embodiments of the present invention. Verilog code may be used to model, design, verify, and/or implement a processor that is capable of application of complex opcodes.

For example, Verilog may be used to generate a register transfer level (RTL) description of logic that may be used to execute complex opcodes. The RTL description of the logic may then be used to generate data, e.g., graphic design system (GDS) or GDS II data, used to manufacture the desired logic or device. The Verilog code, the RTL description, and/or the GDS II data may be stored on a computer readable medium. The instructions executed by the logic to perform aspects of the present invention may be coded in a variety of programming languages, such as C and C++, and compiled into object code that may be executed by the logic or other device.

Aspects of the present invention may be stored, in whole or in part, on a computer readable media. The instructions stored on the computer readable media may adapt a processor to perform the invention, in whole or in part, or be adapted to generate a device, e.g., processor, ASIC, other hardware, that is specifically adapted to perform the invention in whole or in part. These instructions may also be used to ultimately configure a manufacturing process through the generation of maskworks/photomasks to generate a hardware device embodying aspects of the invention described herein.

What is claimed is:

1. A method for processing instructions represented by opcodes in an execution unit having multiple pipelines, the method comprising:
   receiving data by the execution unit with respect to an instruction including complex opcode data, wherein the instruction uses a single entry in a scheduler, the single entry including all source operands of the instruction;
   queuing the instruction for pipeline processing within the execution unit based on the complex opcode data wherein a single instruction using several sources as operands is used throughout the execution unit; and
   executing the instruction using the single entry in the scheduler at least a first time to get an address value and at least a second time to get a result of an operation represented by the instruction.

2. The method of claim 1 where a supported set of instructions includes a set of x86 instructions and wherein receiving data by the execution unit includes receiving opcode data.

3. The method of claim 1, wherein the execution unit is configured with an opcode queue and each opcode queue position supports a plurality of sources with a destination decoded from the data.

4. The method of claim 3, wherein each opcode queue position is generic with respect to load/store support for an address generation pipeline and simple opcode support for arithmetic logic pipeline, and is configured with a source and destination designation for the opcode queue position.

5. The method of claim 1, wherein for processing complex opcodes, a complex opcode is split into a load/store instructions component and a simple opcode component and an internal source and destination between the load/store instructions component and a simple opcode component is created.

6. The method of claim 5, wherein an internal destination designation is provided to the simple opcode component by the execution unit which is used as an internal source for the simple opcode component.

7. The method of claim 5, wherein an internal destination designation is provided for the result of processing the simple opcode component, wherein the internal destination designation is used as an internal source for the load/store instructions component.

8. The method of claim 4, wherein an instruction represented by complex opcodes is associated with any of the sources available for the queue position.

9. The method of claim 1, further comprising executing the instruction at least a plurality of times to pick a queue position holding a complex opcode, once for each part of the complex opcode.

10. An integrated circuit (IC) comprising:
    an execution unit having multiple pipelines, each pipeline configured to process instructions represented by opcodes;
    the execution unit configured to receive data with respect to an instruction, the received data including complex opcode data, wherein the instruction uses a single entry in a scheduler, the single entry including all source operands of the instruction;
    the execution unit including a mapper configured to queue the instruction for pipeline processing within the execution unit based on complex opcode data wherein a single instruction using several sources as operands is used throughout the execution unit;
    wherein the execution unit is configured to execute the instruction using the single entry in the scheduler at least a first time to get an address value and at least a second time to get a result of an operation represented by the instruction.

11. The integrated circuit of claim 10, wherein a supported set of instructions includes a set of x86 instructions and wherein receiving data by the execution unit includes receiving opcode data.

12. The integrated circuit of claim 10, wherein the execution unit is configured with an opcode queue and each opcode queue position supports a plurality of sources along with a destination decoded from the data.

13. The integrated circuit of claim 12, wherein each opcode queue position is generic with respect to load/store support for an address generation pipeline and simple opcode support for arithmetic logic pipeline and is configured with a source and destination designation for the opcode queue position.

14. The integrated circuit of claim 10, wherein for processing complex opcodes, a complex opcode is split into a load/store instructions component and a simple opcode component and an internal source and destination between the load/store instructions component and a simple opcode component is created.

15. The integrated circuit of claim 14, wherein an internal destination designation is provided to the simple opcode component by the execution unit, which is used as an internal source for the simple opcode component.

16. The integrated circuit of claim 14, wherein an internal destination designation is provided for the result of processing the simple opcode component, wherein the internal destination designation is used as an internal source for the load/store instructions component.

17. The integrated circuit of claim 13, wherein an instruction represented by complex opcodes is associated with any of the sources available for the queue position.

18. The integrated circuit of claim 10, wherein the execution unit is further configured to execute the instruction a plurality of times to pick a queue position holding a complex opcode, once for each part of the complex opcode.

19. A non-transitory computer-readable storage medium storing a set of instructions for execution by one or more processors to facilitate a design or manufacture of an integrated circuit (IC), the IC comprising:
    an execution unit having multiple pipelines, each pipeline configured to execute supported instructions that are identified by complex opcodes, wherein each instruction uses a single entry in a scheduler, the single entry including all source operands of the instruction, wherein the execution unit is configured to execute an instruction using the single entry in the scheduler at least a first time to get an address value and at least a second time to get a result of an operation.

20. The non-transitory computer-readable storage medium of claim 19, wherein the instructions are hardware description language (HDL) instructions used for the manufacture of a device.

\* \* \* \* \*